F. L. WHITE.
AUTOMATIC ANTISCALDING AND MIXING VALVE.
APPLICATION FILED OCT. 12, 1908.

941,596.

Patented Nov. 30, 1909.

WITNESSES
A. T. Palmer
Ethel M. Potter

INVENTOR
FREDERICK L. WHITE
BY Smith & Frisbie
ATT'YS

F. L. WHITE.
AUTOMATIC ANTISCALDING AND MIXING VALVE.
APPLICATION FILED OCT. 12, 1908.

941,596.

Patented Nov. 30, 1909.
2 SHEETS—SHEET 2.

WITNESSES
A. F. Palmer
Ethel M. Potter.

INVENTOR
FREDERICK L. WHITE
BY
Smith & Frisbie
ATT'YS.

UNITED STATES PATENT OFFICE.

FREDERICK L. WHITE, OF CAMBRIDGE, MASSACHUSETTS.

AUTOMATIC ANTISCALDING AND MIXING VALVE.

941,596.  Specification of Letters Patent.  Patented Nov. 30, 1909.

Application filed October 12, 1908. Serial No. 457,292.

*To all whom it may concern:*

Be it known that I, FREDERICK L. WHITE, a citizen of the United States, residing at Cambridge, in the county of Middlesex and State of Massachusetts, have invented certain new and useful Improvements in Automatic Antiscalding and Mixing Valves, of which the following is a specification, reference being had therein to the accompanying drawing.

My invention relates to certain improvements in automatic anti-scalding and mixing valves whereby hot and cold water can be thoroughly mixed in the degrees of temperature desired and the hot water automatically shut off if the cold water for any reason is turned off, or the flow of same from the cold water pipe into the valve chamber considerably lessened.

Another object is the arrangement of its parts allowing of the device to be quickly attached to the hot and cold water pipes.

The invention consists in the combination of elements and in certain parts of novel construction entailed in the combination of said elements to obtain the desired results.

A full understanding of my invention can best be given by a detailed description of a preferred construction embodying the various features of my invention, and such a description will now be given in connection with the accompanying drawings, and I obtain my objects by the mechanism there illustrated, showing such preferred construction, and the features forming the invention will then be specifically pointed out in the claims.

Figure 1:
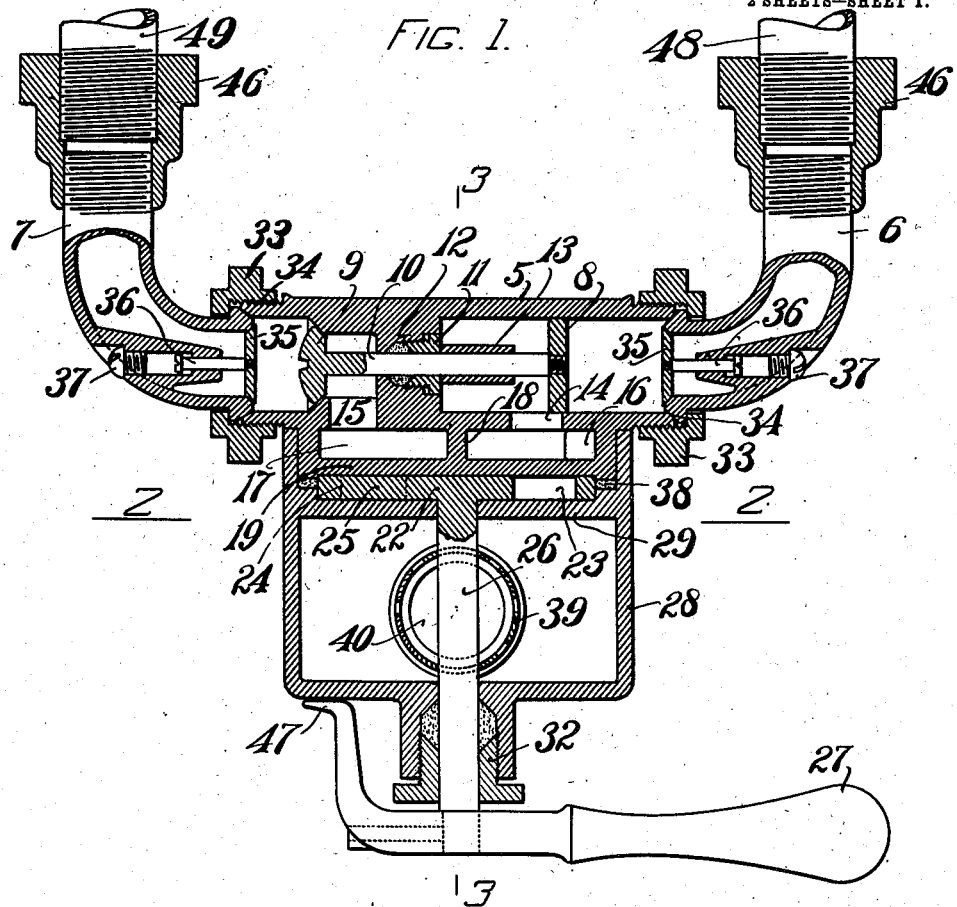
Figure 2:
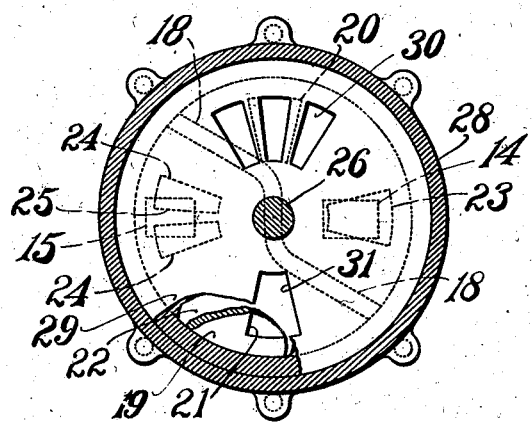
Figure 3:
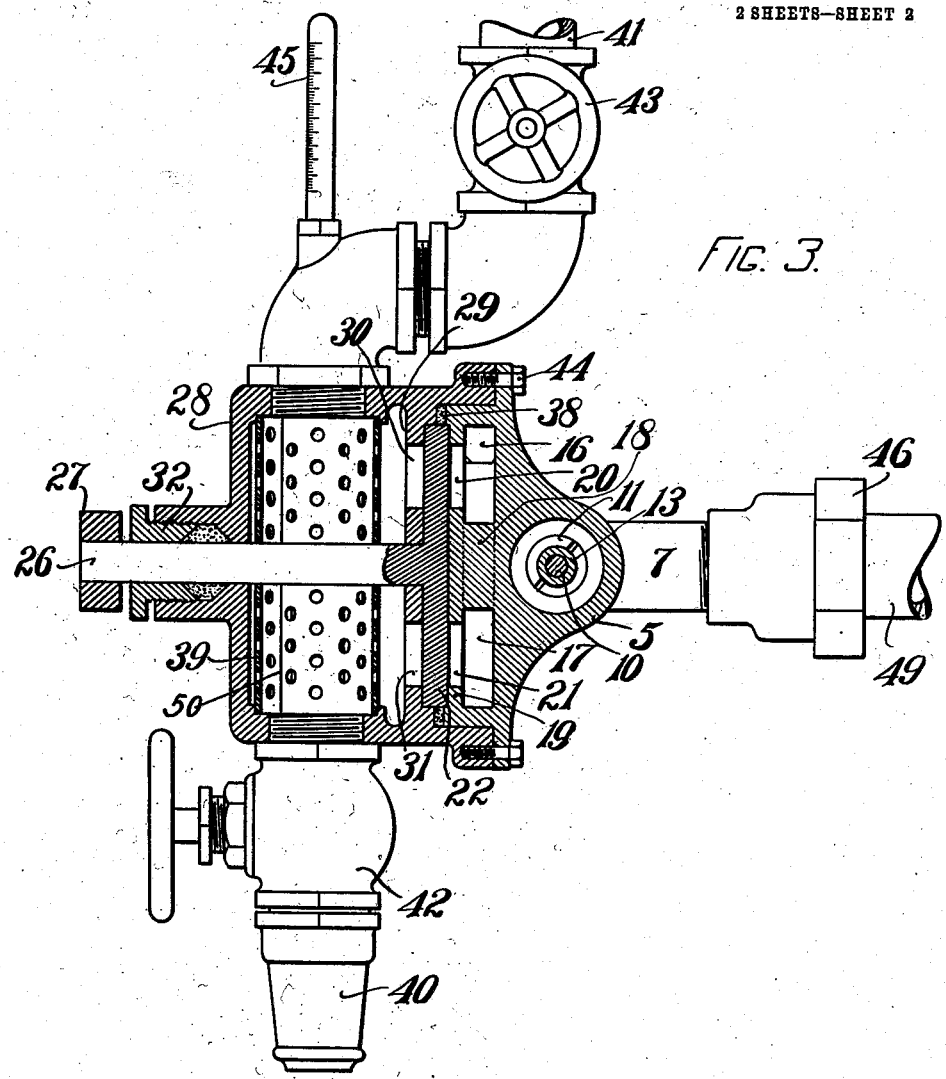

In the accompanying drawings, Figure 1 is a horizontal section of my automatic antiscalding and mixing valves. Fig. 2 is a transverse sectional view on line 2—2 of Fig. 1. Fig. 3 is a central sectional view on line 3—3 of Fig. 1.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

The valve box or casing 5 is adapted to receive water from the cold water pipe 48 through the union ells 6 and water from the hot water pipe 49 through the union ells 7.

The cold water valve 8 and the hot water valve 9 are on the opposite ends of valve stem 10 and are respectively in the cold and hot water chambers of the valve casing formed by the parting wall 12; leakage being prevented between the chambers by the packing box 11. A sleeve 13 on the valve stem within the cold water chamber limits the endwise movement of the valves in one direction, as to the left; their movement in the other direction or to the right being limited by the valve 9 coming in contact with its seat formed on the inner side of the valve casing.

As the water passes from the union ell 6 into the valve casing 5 it pushes open the valve 35 and pushes the valve 8 to the left which opens valve 9 thus opening the inlets 14 and 15 to the cold and hot water respectively; the cold water passing from its chamber in the valve casing through the cold water inlet 14 on the inner side of the valve casing 5 into the chamber 16, which chamber is situated together with the chamber 17 between the partition 19 and the inner wall of valve casing 5, a cross-partition 18 separating the chamber 17 from the chamber 16, and the cold water then passing through the opening 20 in the partition 19, thence, if the disk 22 has been moved to a position allowing of the same, through the openings 24 in the revolving disk 22 on the inner end of the spindle 26 between the partition 19 and the inner wall 29 of the mixing chamber, the disk 22 being turned by the handle 27 to allow the water to pass through the openings 20, 24 and through one or more of the passageways 30 in the inner wall 29 of the mixing chamber 28; the amount of water passing into the mixing chamber being regulated by the turning of the disk 22.

As the hot water passes from the union ell 7 into the valve casing 5 it pushes in another valve 35 on a screw stud 36. The valve 9 being open the water passes through the hot water inlet 15 into the chamber 17 and thence through the opening 21. If the disk 22 has been turned so that its opening 23 registers with the opening 21 and passageway 31, which latter passageway is in the inner wall 29 of the mixing chamber 28, then the hot water will pass through and into the mixing chamber; the amount of hot water passing into the mixing chamber being regulated by the turning of the disk 22. It is apparent from examination of Fig. 1 of the drawings that hot water can pass from the hot water chamber in the valve casing 5 and thence through the hot water inlet 15 only when a sufficient stream of water is being forced into the opposite chamber of the valve casing and therefore, if the amount of hot and cold water passing into the mixing chamber 28 has been regulated by the disk 22 and the cold water is suddenly turned off, or the amount of water from the cold water pipe passing into the valve chamber 5 is considerably diminished, that the pressure of hot water will act against the valve 9 to close it, thus preventing scalding water from passing from the mixing chamber into the faucets.

Each valve 35 is used to close its respective union ell, if the pressure of water coming from one union ell is considerably greater than the pressure of water coming through the opposite valve 35 so that water will not come from the cold water pipe and pass through the various cold water inlets and back up into the hot water inlets and thence into the hot water pipe, nor can water come from the hot water pipe, and thence to the hot water inlets into the mixing chamber and thence back up through the cold water inlets into the cold water pipe if the pressure from the hot water pipe is considerably greater than that in the cold water pipe. These valves 35 are screwed on the inner end of the screw studs 36; the head of the studs being covered by the screws 37. If the handle 27 has been turned so that the disk 22 has closed the openings and passageways between the valve casing 5 and the mixing chamber 28 the pressure of water from one of the pipes could not, of course, force the water back into the other pipe when the pressure of water in the other pipe was considerably lower, even though the valves 35 were not in use; but the valves 35 are necessary to prevent this trouble in case the disk 22 had been left in the position where its openings partly registered with the inlets.

Packing box 32 prevents leakage from the mixing chamber 28 around the stem 26 and a pointer 47 is used for pointing to the indicating words or symbols that would preferably be on the front side of the mixing chamber 28 or on a dial attached thereto; these words and dial not being shown as they form no necessary part of this application.

Within the mixing chamber 28 from top to bottom is a perforated cylinder 39, through which the spindle 26 passes, and the ends of the cylinder surround the passageway extending into the piping 41 and bib 40 so that all water passing upward into the piping 41 or downward into the bib 40 will necessarily pass into and through this perforated cylinder 39 and thus a more thorough mixing is obtained of the water received from the two different sources. The cylinder 39 is slit lengthwise as at 50 so that it can be rolled sufficiently small enough to allow it to pass through one of the threaded holes leading to the mixing chamber 28, preferably the lower threaded hole into which the valve 42 is afterward screwed, and after being inserted through the threaded holes it is allowed to assume its circular position within the mixing chamber and is held in the proper position within the mixing chamber by each end being inserted in a circular ring integral with the mixing chamber on its inner side, as clearly shown in Fig. 3. Valve 42 controls the flow of water from the bib 40 and valve 43 controls the supply of water to the piping 41. Thermometer 45 indicates the degree of temperature of water in the perforated cylinder of the mixing chamber. A packing ring 38 extends around the periphery of the disk between the partition 19 of the valve casing 5 and the inner wall 29 of the mixing chamber 28.

Couplings 46 connect the union ells 6 and 7 with their respective hot and cold water pipes 48 and 49 and couplings 33 connect the opposite ends of the union ells with the ends of the valve casing 5 in such a manner that the union ells are seated against the ends of the valve casing 5 as at 34 forming a revoluble connection allowing the union ells to be connected to the hot and cold water pipes, no matter from which direction the pipes extend, which arrangement is equally adaptable for use with floor or ceiling pipes as well as wall pipes and can be used with one pipe coming from one direction and the other pipe from another direction, as for example one pipe from the floor and the other pipe from the wall or ceiling. In order to attach the same the couplings 33 are unscrewed, then the union ells 6 and 7 are attached to the pipes 48 and 49 by the couplings 46 and the opposite ends of the union ells pressed against the seats 34 and secured by the couplings 33. The screw studs 36 movable in their recesses in the union ells are covered by the screws 37. It will be noticed that the hot and cold water does not pass directly from the union ells into the mixing chamber but passes first into valve casings having valves automatically controlling the supply of hot and cold water and that the supply of hot and cold water to the mixing chamber is regulated by the disk 22, which disk is provided with the throttler 25 between the openings 24 so as to throttle the cold water as desired. It will also be noticed that the life of my apparatus, being free from springs, will be considerably longer than that of other valves that are now on the market.

It is apparent that my apparatus is not confined to the mixing of water of different temperatures but can be used when two different liquids from the two pipes are desired to be mixed, as for example wine and water.

It is understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

Having thus described my invention, I claim as new and desire to secure by Letters Patent:—

1. In a mixing faucet, a valve chamber, a mixing chamber, passageways between the chambers, a partition between the inner wall of the valve chamber and the wall of the mixing chamber, a disk between the partition and the wall of the mixing chamber and provided with openings, a cross partition between the partition and the inner wall of the valve chamber and means for moving the disk to allow the passageways between the valve chamber and the mixing chamber to register the desired amount.

2. In an automatic anti-scalding and mixing valve, a valve chamber, a valve adapted to be closed by the pressure of the hot water and to shut off the hot water when the pressure of cold water in the valve is greatly reduced, a mixing chamber, a partition between the inner wall of the valve chamber and the wall of the mixing chamber, a disk between the partition and the wall of the mixing chamber, a handle, and the wall of the chambers, partition and disk being provided with passageways registering with each other when the handle is turned.

3. In an automatic anti-scalding and mixing valve, a valve casing, a parting wall separating the interior of the casing into two chambers, a valve stem extending through the wall, a valve in each chamber attached to the stem and one of the valves adapted to be pushed by pressure of liquid inward toward the wall and to simultaneously open the other valve, a mixing chamber, a partition between the inner wall of the valve chamber and the inner wall of the mixing chamber, a disk between the partition and the inner wall of the mixing chamber, means for turning the disk and the casing, partition, disk and wall of the mixing chamber being provided with passageways adapted to partly or wholly register with each other when the disk is turned.

4. In an automatic anti-scalding and mixing valve, a valve casing, diametrically opposite union ells at each end of the casing provided with openings in their sides, valves at and carried by the inner ends of the ells, and screw studs within the openings in the ells and attached to the valves.

5. In an automatic anti-scalding and mixing valve, a valve casing, a mixing chamber, a partition between the inner wall of the valve casing and the inner wall of the mixing chamber, a cross-partition between the partition and the inner wall of the valve casing, and a revoluble disk between the partition and mixing chamber and provided with a throttler for throttling one of the liquids as it passes from the valve casing into the mixing chamber.

6. In an anti-scalding and mixing valve, a valve casing, a cold water valve within one end of the casing, a hot water valve within the other end of the casing, a parting wall separating the two valves, a mixing chamber, a partition between the inner wall of the valve casing and the wall of the mixing chamber, a disk revolubly mounted between the partition and the wall of the mixing chamber, a cross-partition between and connecting the partition and the inner wall of the valve casing, the casing, partition, disk and mixing chamber being provided with passageways leading from the valve casing to the mixing chamber and registering with each other when the disk has been revolved to proper position.

7. In an anti-scalding and mixing valve for supplying a mixture of hot and cold water, a valve casing, a cold water supply pipe at one end of the casing, a hot water supply pipe at the opposite end of the casing, a parting wall within the casing separating the same into two chambers, a valve within each chamber, a stem extending through the parting wall and attached to the valves, the valve within the cold water chamber adapted to be opened by pressure of the cold water and the valve within the hot water chamber adapted to be simultaneously opened, a mixing chamber, a partition between the inner wall of the valve casing and the wall of the mixing chamber, a disk revolubly mounted between the partition and the wall of the mixing chamber, a cross-partition between and connecting the partition and the inner wall of the valve casing, and the casing, partition, disk and mixing chamber being provided with passageways adapted to register with each other, and a handle for moving the disk and closing the passageway between the valve casing and mixing chamber.

In testimony whereof I affix my signature in presence of two witnesses.

FREDERICK L. WHITE.

Witnesses:
CHARLES F. A. SMITH,
FRANKLIN S. FRISBIE.